United States Patent
Tuz et al.

(10) Patent No.: US 12,157,074 B2
(45) Date of Patent: Dec. 3, 2024

(54) DEHYDRATING AND DEGASSING UNIT

(71) Applicant: SCIENCE & PRACTICE LIMITED LIABILITY COMPANY, Moscow (RU)

(72) Inventors: Nikolay Anatolevich Tuz, Moscow (RU); Denis Valerevich Kurganov, Moscow (RU)

(73) Assignee: SCIENCE & PRACTICE LIMITED LIABILITY COMPANY, Moscow (RU)

( * ) Notice: Subject to any disclaimer, the term of this patent is extended or adjusted under 35 U.S.C. 154(b) by 515 days.

(21) Appl. No.: 17/282,224

(22) PCT Filed: Oct. 4, 2018

(86) PCT No.: PCT/RU2018/000657
§ 371 (c)(1),
(2) Date: Apr. 1, 2021

(87) PCT Pub. No.: WO2020/071942
PCT Pub. Date: Apr. 9, 2020

(65) Prior Publication Data
US 2021/0331090 A1    Oct. 28, 2021

(30) Foreign Application Priority Data

Oct. 2, 2018   (RU) ........................... RU2018134601

(51) Int. Cl.
*B01D 19/00*    (2006.01)
*B01D 17/02*    (2006.01)
(Continued)

(52) U.S. Cl.
CPC ..... *B01D 19/0047* (2013.01); *B01D 17/0205* (2013.01); *B01D 17/044* (2013.01);
(Continued)

(58) Field of Classification Search
None
See application file for complete search history.

(56) References Cited

U.S. PATENT DOCUMENTS

| 3,675,395 A | 7/1972 | Baranowski |
| 5,314,613 A * | 5/1994 | Russo ................ C10M 175/005 208/185 |

(Continued)

FOREIGN PATENT DOCUMENTS

| RU | 2 071 972 | 1/1997 |
| RU | 120 650 | 9/2012 |

(Continued)

OTHER PUBLICATIONS

International Search Report for PCT/RU2018/000657 dated Jun. 6, 2019, 3 pages.
(Continued)

*Primary Examiner* — Jason M Greene
(74) *Attorney, Agent, or Firm* — Nixon & Vanderhye PC

(57) ABSTRACT

The invention relates to devices for purifying hydraulic and dielectric fluids (oils and fuels) of dispersed and dissolved water. The unit for dehydrating and degassing hydraulic and dielectric fluids comprises a vacuum tank, an atomizer with a spray member, said atomizer being disposed in the vacuum tank, a hydraulic feed pump connected by a pipe to the atomizer, a hydraulic discharge pump connected by a pipe to the tank, and a vacuum pump connected by a pipe to the tank, wherein the atomizer is arranged vertically in the lower part of the vacuum tank with the spray member oriented upward and consists of: a T fitting with a lower inlet for oil and with a lateral air inlet; a mixing chamber disposed above the T fitting; and a spray member disposed above the mixing chamber. The technical result consists in providing more efficient dehydration and degassing of hydraulic and dielectric fluids, increasing useful volume of the vacuum tank
(Continued)

without increasing the dimensions thereof, reducing the dispersivity of fluid sprayed from the atomizer, and simplifying the design.

6 Claims, 4 Drawing Sheets

(51) Int. Cl.
*B01D 17/04* (2006.01)
*C10M 175/00* (2006.01)
*C10N 40/08* (2006.01)
*C10N 70/00* (2006.01)

(52) U.S. Cl.
CPC ..... *B01D 19/0005* (2013.01); *B01D 19/0036* (2013.01); *C10M 175/005* (2013.01); *C10N 2040/08* (2013.01); *C10N 2070/00* (2013.01)

(56) References Cited

U.S. PATENT DOCUMENTS

| | | | | |
|---|---|---|---|---|
| 5,811,013 A | * | 9/1998 | Ito | B01D 17/0205 210/708 |
| 6,383,367 B1 | * | 5/2002 | Grotheim | B01D 17/0205 210/220 |
| 2021/0339270 A1 | * | 11/2021 | Tuz | B01D 19/0036 |

FOREIGN PATENT DOCUMENTS

| | | |
|---|---|---|
| SU | 1765552 | 9/1992 |
| SU | 1771796 | 10/1992 |

OTHER PUBLICATIONS

Written Opinion of the ISA for PCT/RU2018/000657 dated Jun. 6, 2019, 3 pages.

* cited by examiner

DEHYDRATING AND DEGASSING UNIT

This application is the U.S. national phase of International Application No. PCT/RU2018/000657 filed Oct. 4, 2018 which designated the U.S. and claims priority to RU Patent Application No. 2018134601 filed Oct. 2, 2018, the entire contents of each of which are hereby incorporated by reference.

FIELD OF THE INVENTION

The invention relates to devices for purifying hydraulic and dielectric fluids (oils and fuels) of dispersed and dissolved water.

BACKGROUND

The prior art discloses an apparatus for dehydrating insulation (transformer) oils, comprising a vacuum tank, vacuum pump, oil feed/discharge pumps, atomizer, atomizer air inlet, a pack consisting of solid and gauze caps (the closes prior art—SU1771796 A1, publ. Oct. 30, 1992).

The disadvantages of this design are as follows: very difficult-to-make vacuum tank, availability of additional elements in the tank (solid and gauze caps) complicating the design, small useful volume of vacuum tank, low oil pumping capacity, low transformer oil breakdown voltage after dehydration, large oil flow dispersion at spray atomizer outlet and, consequently, low-efficient oil dehydrating off oil-dissolved water.

DISCLOSURE OF THE INVENTION

The technical problem is creation of a device able to dehydrate and degas hydraulic and dielectric fluids effectively.

The technical result consists in providing more efficient dehydration and degassing of hydraulic and dielectric fluids, increasing useful volume of the vacuum tank without increasing the dimensions thereof, reducing the dispersivity of fluid sprayed from the atomizer, and simplifying the design.

The technical result is achieved due to the fact that the unit for dehydrating and degassing hydraulic and dielectric fluids comprises a vacuum tank, an atomizer with a spray member, said atomizer being disposed in the vacuum tank, a hydraulic feed pump connected by a pipe to the atomizer, a hydraulic discharge pump connected by a pipe to the tank, and a vacuum pump connected by a pipe to the tank, wherein the atomizer is arranged vertically in the lower part of the vacuum tank with the spray member oriented upward and consists of: a T fitting with a lower inlet for oil and with a lateral air inlet; a mixing chamber disposed above the T fitting; and a spray member disposed above the mixing chamber.

Atomizer fluid inlet pressure is minimum 6 atm.

The atomizer is hermetically seated in the lower part of the vacuum tank so that its upper part with a spray member and nozzle is inside the tank, and its lower part with T fitting, oil and air inlets, and mixing chamber is disposed outside the tank.

Vacuum tank pressure is maximum −0.8 atm.

Temperature of fluid fed to the tank is 45-95° C.

Two faceplates with openings are installed in the atomizer, one of them is for oil and the other one is for air.

Oil faceplate is installed at oil pipe end upstream from the mixing chamber, with a central opening for oil passing through it to the mixing chamber.

Air faceplate is hermetically seated in the upper part of T fitting with a central opening for a oil pipe passing through it and with openings located on the circumference (around the central opening) for air passing through them to the mixing chamber. Air is supplied directly to the mixing chamber, that enables to obtain finer mist.

EMBODIMENT OF THE INVENTION

Figure 1:
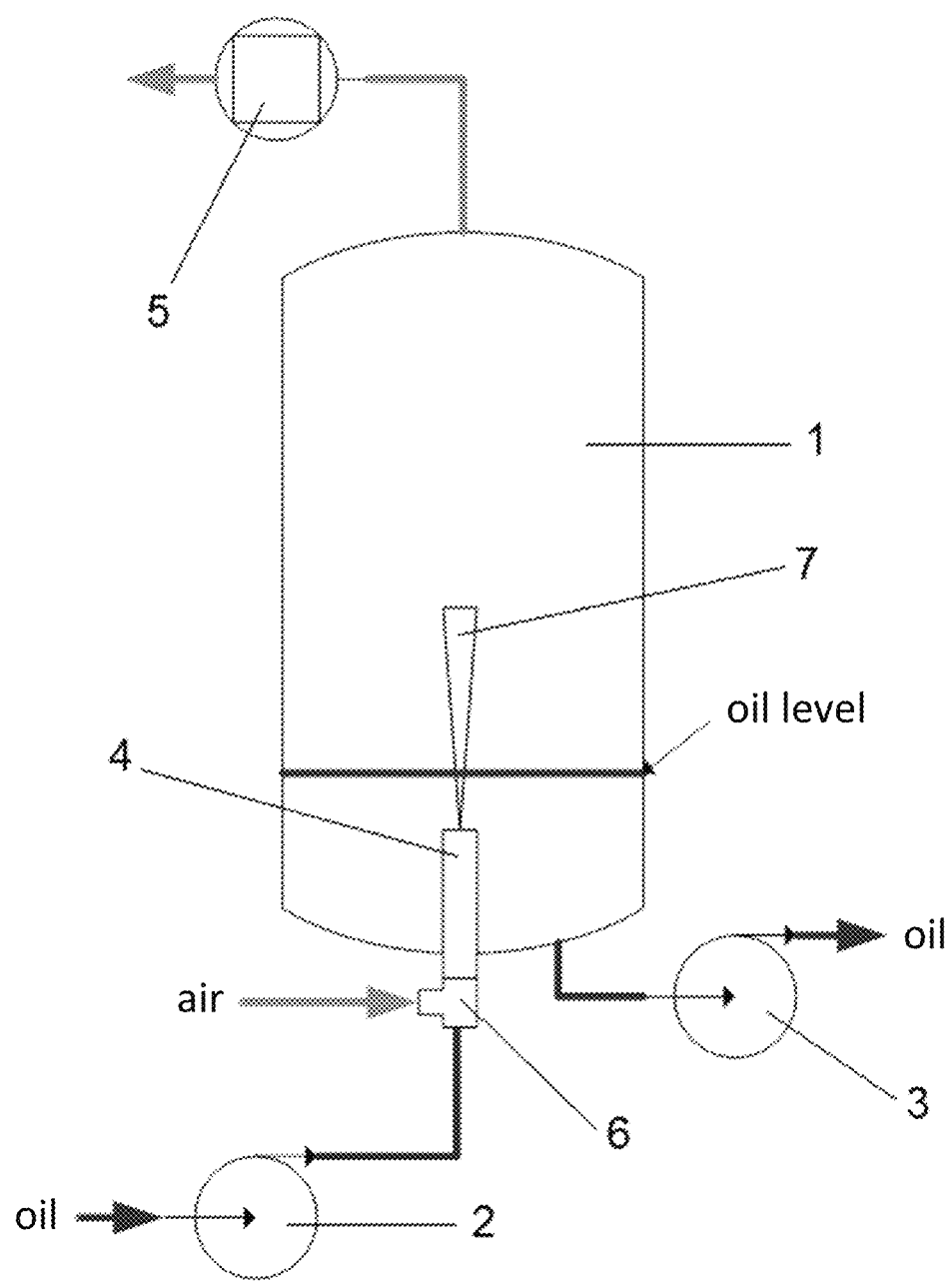
FIG. 1—Schematic diagram of the dehydrating and degassing unit.
Figure 2:
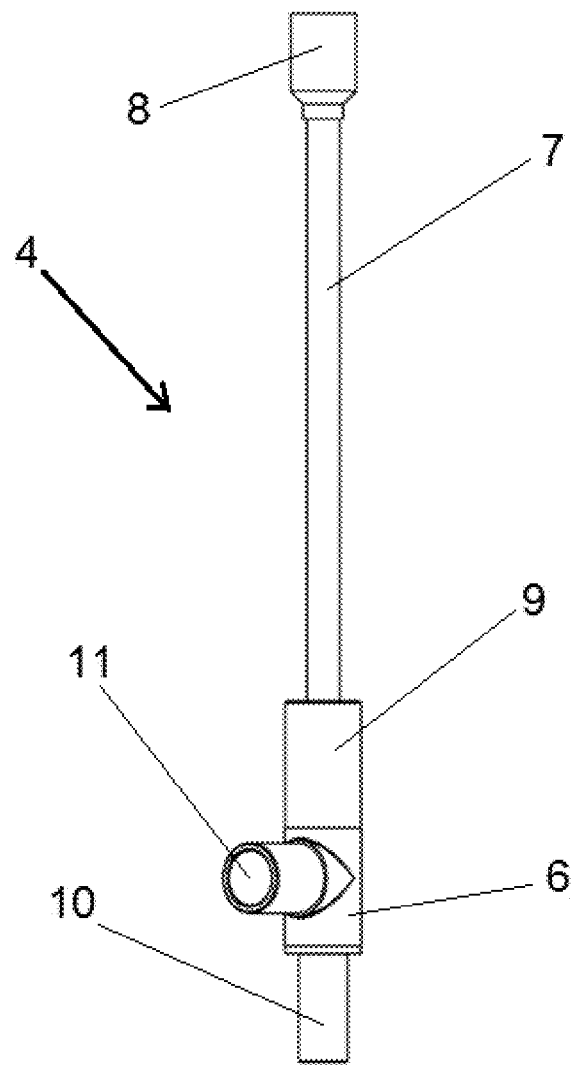
FIG. 2—Schematic view of the atomizer assembly.
Figure 3:
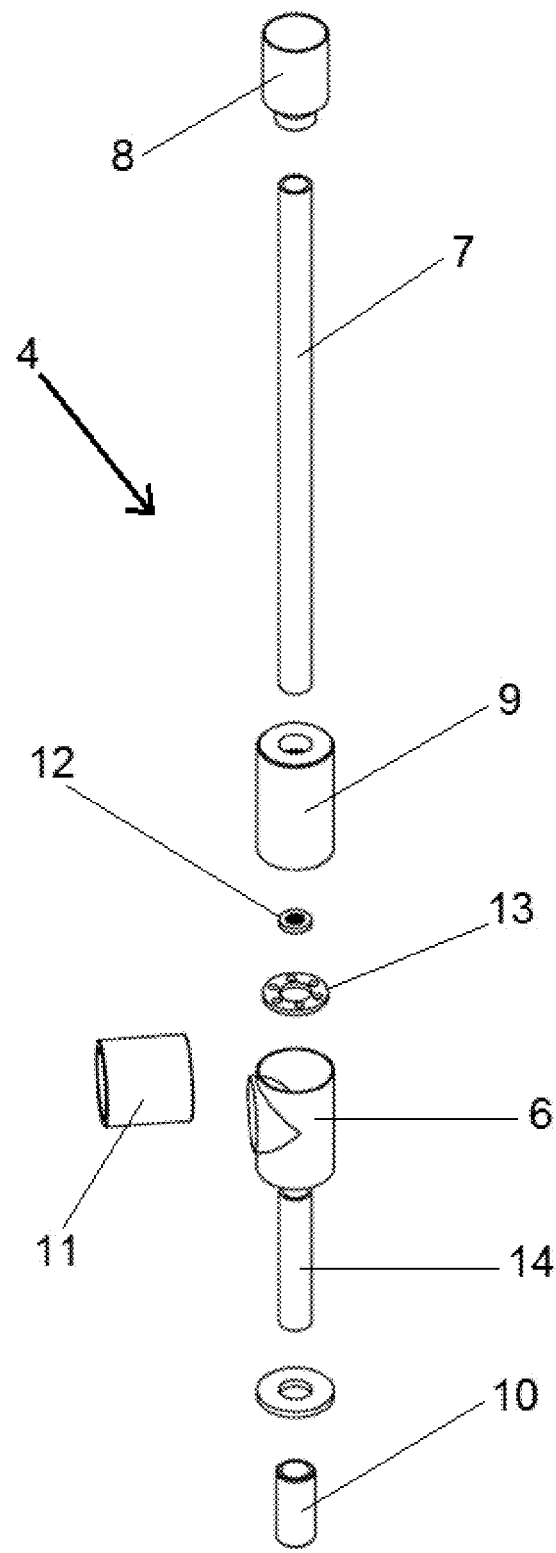
FIG. 3—Schematic view of disassembled atomizer.
Figure 4:
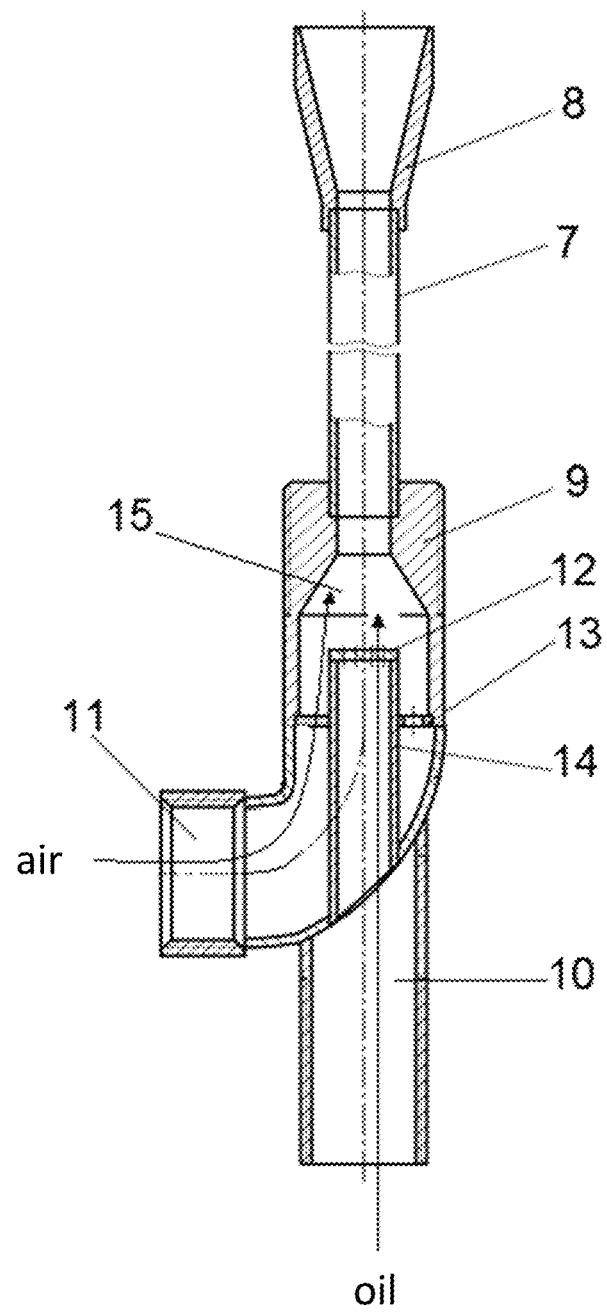
FIG. 4—Schematic view of atomizer interior structure.

The claimed device is intended for purifying any dielectric fluids with permittivity of 1-3 units, e.g. oils, fuels.

Dehydrating and degassing unit includes: vacuum tank 1 with atomizer 4, hydraulic feed pump 2, hydraulic discharge pump 3, vacuum pump 5, which are connected to the vacuum tank by pipelines.

The vacuum tank 1 is cylinder-shaped with constant heightwise diameter, made of, for example, any known metal, including stainless. Tank head and bottom could be as flat as dished (torispherical, elliptical). A foam suppression device could be arranged in the upper part of tank 1.

Atomizer 4 consists of T fitting 6 with lower oil inlet 10 and lateral air inlet 11, housing 9 of mixing chamber 15 disposed above the T fitting, spray member 7 with nozzle 8 above the housing 9 of the mixing chamber 15. The atomizer 4 is hermetically seated in the lower part of the vacuum tank 1 (in the bottom) vertically with a spray member 7 oriented upward, so that its upper part with spray member 7 and nozzle 8 is inside tank 1, and its lower part with T fitting 6, oil inlet 10, air inlet 11, and housing 9 is disposed outside the tank bottom.

Two faceplates 12, 13 with openings are installed in the atomizer 4 (one is for oil and the other one is for air).

Oil faceplate 12 is installed at oil pipe 14 end upstream from the mixing chamber 15, with a central opening for oil passing through it to the mixing chamber 15.

Air faceplate 13 is hermetically seated in the upper part of T fitting 6 with a central opening for oil pipe 14 passing through it and with openings located on the circumference (around the central opening) for air passing through them to the mixing chamber 15. Air is supplied directly to the mixing chamber 15, that enables to obtain finer mist.

Spray member 7 is over the mixing chamber, above the level of treated fluid pumped by the pump from vacuum tank 1. All elements of the atomizer are interconnected by welds.

A washer is welded on the outside of the tank bottom in line with an aperture for atomizer installation, the atomizer is screwed into internal thread of this washer (there is an external thread on the upper outside of the mixing chamber)

Hydraulic feed pump 2, which delivers oil to atomizer 4, is connected to atomizer 4 inlet (lower inlet 10 of T fitting 6) by a stainless corrugated pipe (main line).

Hydraulic discharge pump 3 is connected to a hole in the lower part of the vacuum tank 1 (in the bottom) by a stainless corrugated pipe, and is designed to remove treated (dehydrated) oil from vacuum tank 1 and to maintain oil level in the vacuum tank below the level of atomizer spray member 7 with nozzle 8.

Vacuum pump 5 is connected by a pipeline to vacuum tank 1 in its upper part and is designed to remove air, supplied through atomizer 4, together with water boiled in vacuum, and to maintain pressure maximum −0.8 atm in vacuum tank 1.

Due to vacuum in the tank air is supplied to the atomizer through lateral inlet 11 of T fitting 6 from atmosphere through air filter (not shown), through a corrugated pipe. Amount of air supplied is regulated by means of flow regulator (not shown) disposed on the corrugated pipe.

Atomizer inlet fluid pressure fed by feed pump should be minimum 6 atm to get finer dispersion of dehydrated oil. Mixing oil with air inside atomizer facilitates jet splitting to oil mist. Air supplied through the atomizer is removed together with water boiled in vacuum by the vacuum pump, which maintains pressure maximum −0.8 atm in the vacuum tank. Treated (dehydrated) oil is removed from the vacuum tank by the discharge pump, maintaining oil level in the vacuum tank below the atomizer spray member level.

The device operates as follows.

Oil is supplied by fed pump 2, under minimum pressure 6 atm, through a pipeline (e.g. corrugated pipe) through lower inlet 10 to T fitting 6 of atomizer 4 disposed in tank 1 vertically with a spray member 7 oriented upward. Due to vacuum in tank 1 the set amount of air, regulated by flow regulator (not shown) disposed on the pipeline, is supplied to atomizer 4 through lateral inlet of T fitting from atmosphere through the air filter through the pipeline. Oil with air through the openings of faceplates 12, 13, disposed in T fitting 6, enter mixing chamber 15, are mixed, and the obtained mixture through spray member 7 with nozzle 8 is sprayed into tank 1 as fine oil mist. In contrast to closest prior art air is supplied directly to the mixing chamber, but not under the atomizer, that enables to obtain finer mist. Maximum pressure −0.8 atm in tank 1 is maintained by vacuum pump 5, due to this the mixture is heated, and dispersed and dissolved water is evaporated and removed by vacuum pump 5. Dehydrated and degassed oil is pumped from the hole on tank 20 bottom through the pipeline by pump 3, maintaining oil level in tank 1 below atomizer spray member 7. Balance between air supplied to the atomizer and air enriched with water evaporated from oil and removed from the tank is maintained by vacuum pump 5 and mixing chamber 15 of atomizer 4. Thus, watered oil is supplied to the device inlet, and at the outlet of the apparatus there is dehydrated oil and moist air removed by vacuum pump.

When the claimed device was in operation, maximum dehydrating and degassing efficiency was achieved at atomizer fluid inlet pressure minimum 6 atm, constant oil flow rate of 2 m3/h, fluid (oil) temperature 45-95° C. and vacuum tank pressure maximum −0.8 atm.

When atomizer fluid inlet pressure was below 6 atm, the atomizer failed to reach normal operating parameters, coarse suspended solids were formed instead of oil mist in the tank, that resulted in reducing dehydrating and degassing efficiency. When atomizer fluid inlet pressure was 18 atm (maximum test pressure), corrugated pipes started to break down, and no significant improvement of oil mist formation took place. When constant oil flow rate was below 2 m3/h, the vacuum pump started to flood with oil and oil mist was not formed in the tank, and when constant oil flow rate was above 2 m3/h, more powerful pump with higher capacity was required that would result in increasing dimensions and materials consumption. When fluid (oil) temperature is below 45° C., additional heater was required, that made the design more complicated, and when oil temperature was above 95° C., oil began to degrade and decompose.

In contrast to closest prior art the claimed device ensures high oil pumping capability (2 m3/h versus analogue 0.5 m3/h), higher breakdown voltage of transformer oil after dehydration (86.8 kV versus analogue 59 kV)

More simple design of the vacuum tank with constant heightwise diameter, atomizer disposed with a spray member oriented upward, fluid supply by fed pump at atomizer inlet pressure minimum 6 atm, and adding air to atomizer for mixing with oil enable increasing useful volume of the vacuum tank without increasing the dimensions thereof, reducing dispersivity of oil sprayed from the atomizer, thereby improving productivity and efficiency of dehydrating and degassing hydraulic and dielectric fluids.

The invention claimed is:

1. A unit configured to dehydrate and degas hydraulic and dielectric fluids, comprising:
    a vacuum tank,
    an atomizer with a spray member, said atomizer being disposed in the vacuum tank,
    a hydraulic feed pump connected by a pipe to the atomizer,
    a hydraulic discharge pump connected by a pipe to the tank, and
    a vacuum pump connected by a pipe to the tank,
    wherein the atomizer is arranged vertically in a lower part of the vacuum tank with the spray member oriented upward and consists of: a T fitting with a lower inlet for oil and with a lateral air inlet; a mixing chamber disposed above the T fitting; and a spray member disposed above the mixing chamber,
    wherein an oil faceplate is installed in the atomizer at an oil pipe end upstream from the mixing chamber, with a central opening configured to accommodate oil passing therethrough to the mixing chamber, and
    wherein an air faceplate is installed in the atomizer and is hermetically seated in the upper part of T fitting with a central opening configured to accommodate the oil pipe passing therethrough, and with openings located on the circumference configured to accommodate air passing therethrough to the mixing chamber.

2. The unit of claim 1, wherein atomizer fluid inlet pressure is at least 6 atm.

3. The unit of claim 1, wherein the atomizer is hermetically seated in the lower part of the vacuum tank so that its upper part with a spray member and nozzle is inside the tank, and its lower part with T fitting, oil and air inlets, and mixing chamber is disposed outside the tank.

4. The unit of claim 1, wherein vacuum tank pressure is at most −0.8 atm.

5. The unit of claim 1, wherein a temperature of fluid fed to the tank is 45-95° C.

6. The unit of claim 1, wherein the oil faceplate and the air faceplate are sized, shaped, and arranged relative to the mixing chamber to promote formation of a vapor-oil mixture in mist form.

* * * * *